(12) United States Patent
Oudelaar et al.

(10) Patent No.: US 8,939,062 B2
(45) Date of Patent: Jan. 27, 2015

(54) DOUBLE-ACTING HYDRAULIC CYLINDER WITH INTEGRATED GAS SPRING ACTION AND METHOD FOR MAKING THE SAME

(75) Inventors: Tone Oudelaar, Beuningen (NL); Willem Herman Masseling, Oldenzaal (NL)

(73) Assignee: Actuant Corporation, Menomonee Falls, WI (US)

( * ) Notice: Subject to any disclaimer, the term of this patent is extended or adjusted under 35 U.S.C. 154(b) by 575 days.

(21) Appl. No.: 13/382,401

(22) PCT Filed: Jul. 6, 2010

(86) PCT No.: PCT/NL2010/050429
§ 371 (c)(1),
(2), (4) Date: Jan. 5, 2012

(87) PCT Pub. No.: WO2011/005086
PCT Pub. Date: Jan. 13, 2011

(65) Prior Publication Data
US 2012/0097024 A1 Apr. 26, 2012

(30) Foreign Application Priority Data
Jul. 9, 2009 (NL) ...................................... 2003161

(51) Int. Cl.
| F16F 9/02 | (2006.01) |
| F15B 15/14 | (2006.01) |
| F16F 9/36 | (2006.01) |
| F16F 9/43 | (2006.01) |

(52) U.S. Cl.
CPC .............. *F15B 15/1476* (2013.01); *F16F 9/36* (2013.01); *F16F 9/435* (2013.01); *F16F 2226/04* (2013.01)
USPC .......................................... 91/167 R; 92/134

(58) Field of Classification Search
CPC ............. E05F 15/042; E05Y 2900/546; F15B 11/072; F15B 15/1476; F16F 9/435; F16F 9/36; F16F 2226/04

USPC ............ 92/85 B, 134; 91/167 R; 188/322.17, 188/322.21
See application file for complete search history.

(56) References Cited

U.S. PATENT DOCUMENTS
2,764,131 A * 9/1956 Knights ............................ 92/62

FOREIGN PATENT DOCUMENTS
| DE | 197 57 460 A1 | 9/1998 |
| DE | 19757460 A1 * | 9/1998 |
| EP | 1 225 345 A1 | 7/2002 |
| EP | 1225345 A1 * | 7/2002 |

OTHER PUBLICATIONS

International Search Report under date of mailing of Oct. 7, 2010 in connection with PCT/NL2010/050429.
Search Report and Written Opinion in connection with NL Patent Application NL2003161 dated Feb. 26, 2010.

* cited by examiner

*Primary Examiner* — Thomas E Lazo
(74) *Attorney, Agent, or Firm* — Michael Best & Friedrich LLP

(57) ABSTRACT

The invention relates to a method for constructing a gas-filled double-acting hydraulic cylinder (1) with gas spring action, comprising: —a cylinder sleeve (3) with a cylinder bottom (3*a*) and cylinder head (3*b*) —a piston/piston rod assembly (5) a hydraulic fluid seal on the piston (9) —a connection for the head-side chamber (13) to a hydraulic line; —a connection for the bottom-side chamber (15) to a hydraulic line, —a gland (20) with a bore, the gland being attached between the cylinder bottom (3*a*) and the piston (9), the piston rod (7) extending over the entire stroke of the piston rod through the bore, wherein the gland comprises two seals —(25), one for providing a seal with the cylinder sleeve (3) and one for providing a seal with the piston rod.

12 Claims, 3 Drawing Sheets

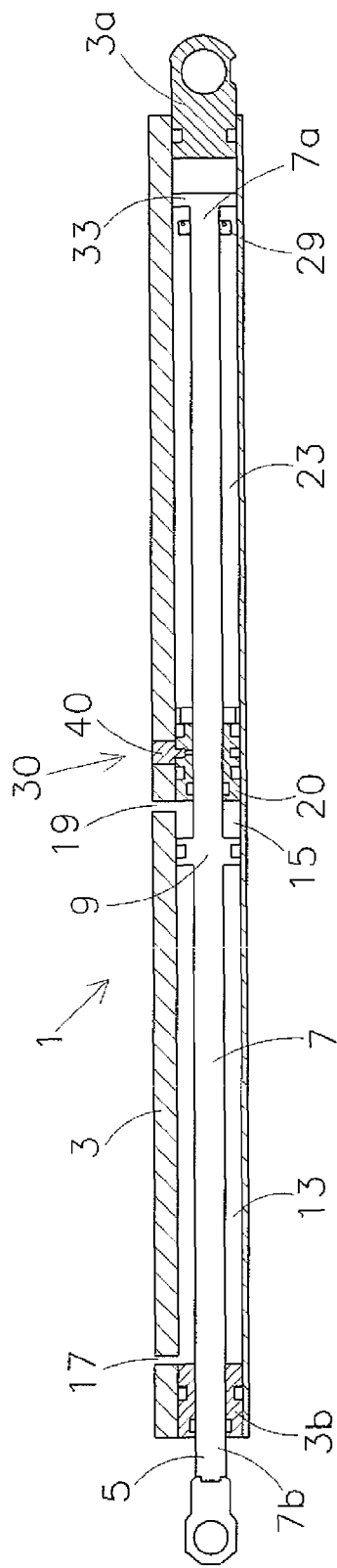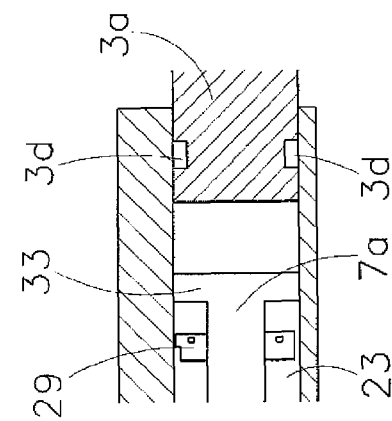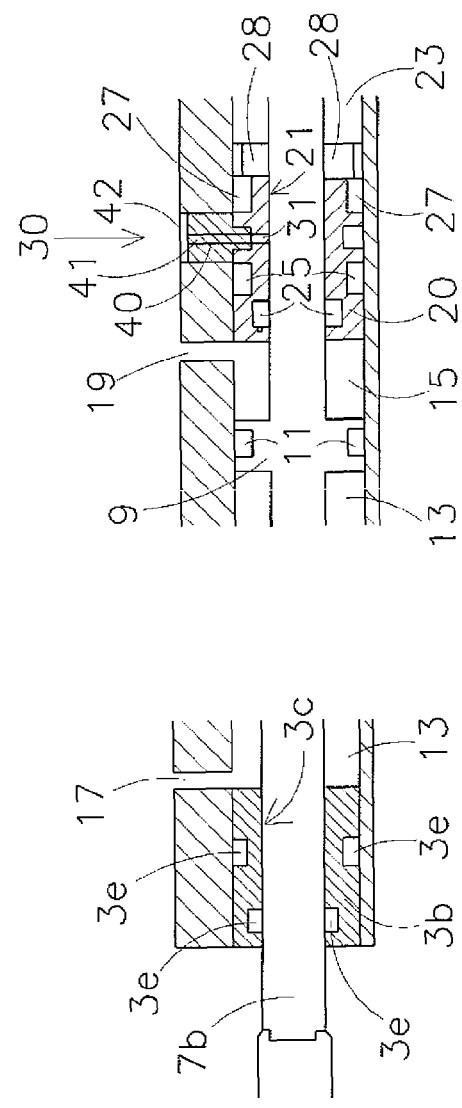
Fig 1a
Fig 1b
Fig 1c
Fig 1d

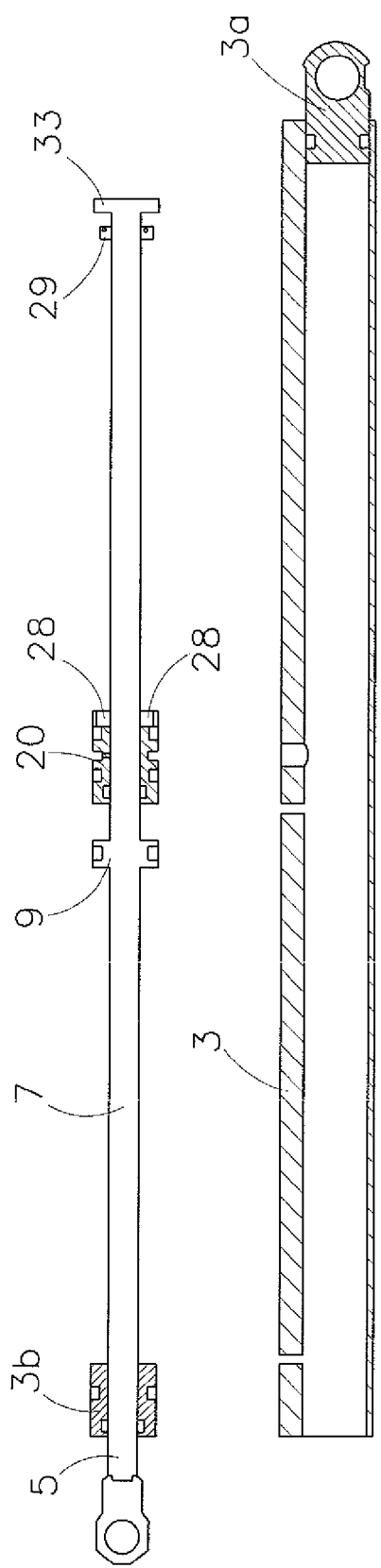
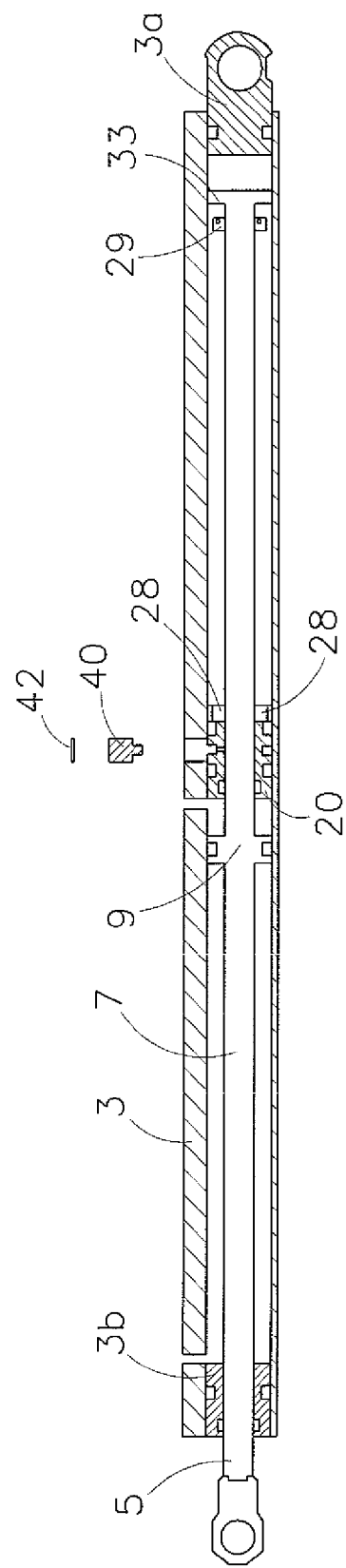
Fig 2
Fig 3

DOUBLE-ACTING HYDRAULIC CYLINDER WITH INTEGRATED GAS SPRING ACTION AND METHOD FOR MAKING THE SAME

CROSS-REFERENCE TO RELATED APPLICATIONS

This application represents the national stage entry of PCT International Application No. PCT/NL2010/050429 filed Jul. 6, 2010 which claims the benefit of Netherlands Patent Application 2003161 filed Jul. 9, 2009, both of which are hereby incorporated herein by reference for all purposes.

The invention relates to a method for constructing a gas-filled double-acting hydraulic drive cylinder with integrated gas spring action according to the preamble of claim 1.

A drive cylinder of this type is shown in FIG. 4 of German publication DE 197 57 460 A1. Hydraulic drive cylinders with integrated gas spring action are for example used for moving car components, such as for example boot covers, boot lids, roofs of convertible cars and associated components, such as for a cover with which a storage compartment for the convertible roof of the vehicle is covered.

The gas space of the drive cylinder from FIG. 4 of DE 197 57 460 A1 is filled with gas via a filling opening in the cylinder bottom which is shut off by a non-return valve. As a result, gas can be introduced in pressurized form, but cannot flow back.

It is an object of the invention to provide an improved method for constructing a gas-filled hydraulic drive cylinder with integrated gas spring action.

For this purpose, the invention provides a method according to claim 1.

An advantage of the method according to the invention is the fact that a non-return valve is not necessary, thus saving costs. The drive cylinder can also be mounted and the gas space filled with gas in an efficient manner. The fact that there is no non-return valve also means that gas cannot escape via this non-return valve, as a result of which leakage losses are limited to a minimum.

Another advantage is the fact that a filling opening does not have to be formed in the cylinder bottom, so that the cylinder bottom preferably does not contain any channels to the gas space. The cylinder bottom has to withstand relatively high forces because the drive cylinder is usually connected there to other components. This allows the cylinder bottom to be made stronger and/or smaller. The ability to make the cylinder bottom smaller may also be advantageous if the overall length of the cylinder is limited.

Still another advantage is the fact that the filling opening is readily accessible. The location of the filling opening now makes it possible, as an option, to already wholly or partially mount the drive cylinder in a system and to fill it with gas only subsequently.

In one embodiment, the gland is secured to the cylinder sleeve by means of a locking pin. Preferably, this locking pin is brought into the filling opening, as a result of which it is not necessary to form an additional opening for this purpose. The gas can then flow along the locking pin during filling or can flow inwards via a bore in the locking pin. After filling with the gas, the filling opening and/or the bore in the locking pin can if desired be shut off by means of a shut-off mechanism, for example in the form of a stopper, plug, peg, dowel pin, plate, etc.

In one embodiment, the filling opening remains under gas pressure until after step h) in order to prevent gas from being able to escape from the gas space. After the second gas seal has been brought in the associated seat on the gland, gas can no longer escape from the gas space and the gas pressure can be removed from the filling opening. Afterwards, the filling opening and/or the bore in the locking pin can if desired be shut off by the shut-off mechanism.

As an alternative, the filling opening and/or the bore in the locking pin can already be shut off between step f) and the end of step h) in order to prevent gas from escaping from the gas space before the second gas seal is placed in its seat.

In one embodiment, the piston/piston rod assembly is blocked in step e) by the mechanical securing of the piston rod. This takes place outside the cylinder by, for example, securely clamping that portion of the piston rod that protrudes outside the cylinder.

In another embodiment, the piston/piston rod assembly can also be blocked in step e) by hydraulic pressure in the head-side chamber of the cylinder. This will usually be associated with the fact that the piston rests against the gland, as a result of which the hydraulic pressure in the head-side chamber blocks a movement towards the cylinder head and the gland blocks a movement towards the cylinder bottom. In an alternative, this is also possible by placing both the head-side and the bottom-side chamber under hydraulic pressure.

In one embodiment, when the piston rod is retracted in step c), the piston rod rests against the cylinder bottom and the piston rests against the gland and a desired position of the gland is thus obtained, after which the gland can easily be secured.

In another embodiment, the entrainment mechanism on the piston rod extends in a non-sealing manner in the radial direction up to the cylinder sleeve. As a result, the entrainment mechanism also prevents sagging of that portion of the piston rod that is located in the gas space. The entrainment mechanism is then embodied as a guide which guides the piston rod in the cylinder.

The invention also relates to a drive cylinder manufactured using the method described hereinbefore.

The invention will be described hereinafter based on an embodiment and with reference to the drawings, in which:

FIG. 1A is a schematic cross section of a double-acting hydraulic drive cylinder with integrated gas spring action according to an embodiment of the invention;

FIG. 1B shows in detail the head-side region of the drive cylinder from FIG. 1A;

FIG. 1C shows in detail the central region of the drive cylinder from FIG. 1A;

FIG. 1D shows in detail the bottom-side region of the drive cylinder from FIG. 1A;

FIG. 2 shows the drive cylinder from FIG. 1A in a construction step of a method according to an embodiment of the invention;

FIG. 3 shows the drive cylinder from FIG. 1A in another construction step of the method according to an embodiment of the invention;

Figure 4:
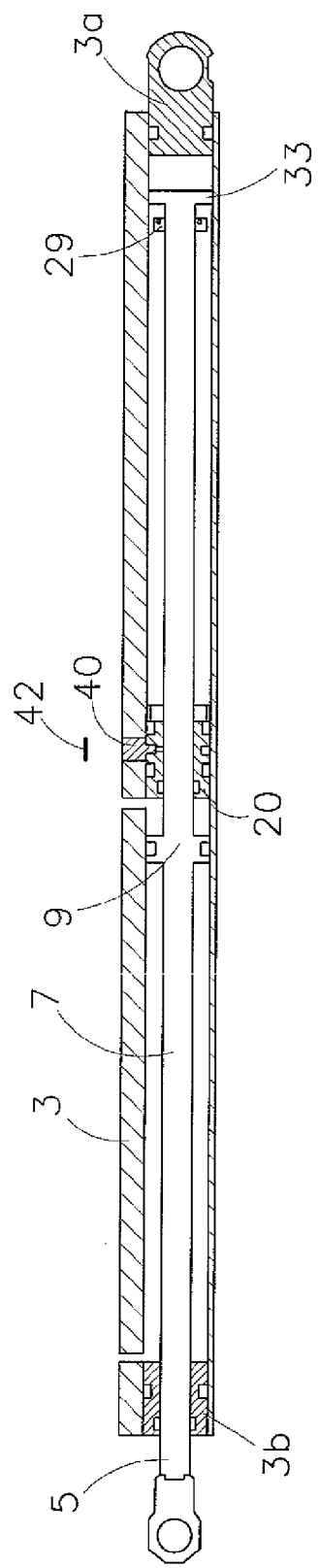
FIG. 4 shows the drive cylinder from FIG. 1A in a further construction step of the method according to an embodiment of the invention.
Figure 5:
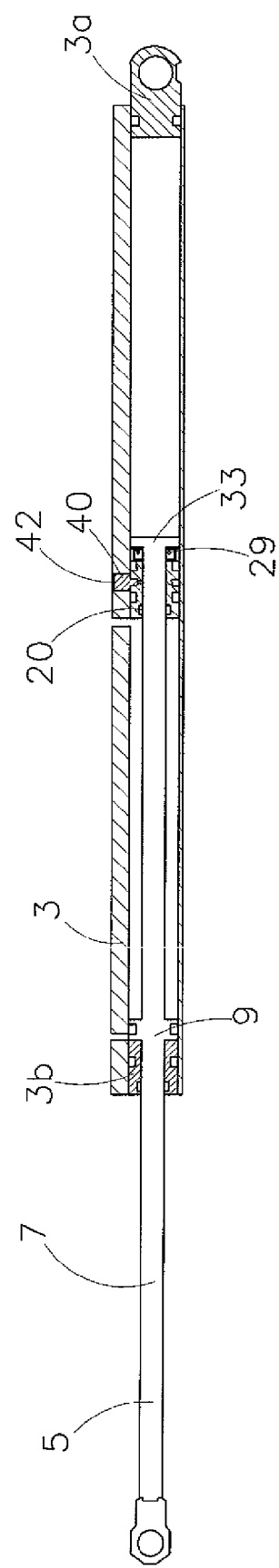
FIG. 5 shows the drive cylinder from FIG. 1A in another construction step of the method according to an embodiment of the invention.

FIG. 1A is a schematic cross section of a double-acting hydraulic drive cylinder 1 with integrated gas spring action according to an embodiment of the invention. The drive cylinder 1 comprises a cylinder sleeve 3 with a cylinder bottom 3a and cylinder head 3b arranged set axially apart from each other and a piston/piston rod assembly 5 which can move axially back and forth, with a piston rod 7 which protrudes outwards through an associated bore 3c (see FIG. 1B) in the cylinder head 3b, and with a piston 9 which is securely attached to the piston rod 7 between and set apart from two ends 7a, 7b of the piston rod 7 and which is displaceable over an axial stroke between the cylinder bottom 3a and the cylinder head 3b.

A hydraulic fluid seal 11 (see FIG. 1C) is attached to the piston 9 for providing a seal with an inner surface of the cylinder sleeve 3, so that the piston 9 delimits in the drive cylinder 1 between the piston 9 and the cylinder head 3b a variable head-side chamber 13 and further delimits between the piston 9 and the cylinder bottom 3a a variable bottom-side chamber 15.

For hydraulic lines (not shown), a connection 17 for the head-side chamber 13 and a connection 19 for the bottom-side chamber 15 are provided. Hydraulic fluid can be conveyed to and from the associated head-side and bottom-side chamber via the hydraulic lines. The pressure exerted on the piston 9 by the hydraulic fluid determines the force on the piston and any displacement of the piston in the axial direction.

The drive cylinder 1 also comprises a gland 20 with a bore 21 (see FIG. 1C), the gland 20 being attached between the cylinder bottom 3a and the piston 9, so that the gland 20 forms a separation between the bottom-side chamber 15 and a gas space 23 located between the gland 20 and the cylinder bottom 3a. The piston rod 7 extends through the bore 21 over the entire axial stroke of the piston rod 7.

The gland 20 has on the head-side edge two hydraulic fluid seals 25, one for providing a seal with the cylinder sleeve 3 and one for providing a seal with the piston rod 7. On the bottom-side edge, the gland has a first gas seal 27 and a second gas seal 29. The first gas seal 27 provides a seal with the cylinder sleeve 3 and the second gas seal 29 provides a seal with the piston rod 7. FIG. 1A and FIG. 1D show the second gas seal 29 out of its seat 28 in order to be able to show in detail the seat and the manner in which the second gas seal sits in this seat.

The cylinder sleeve 3 has a filling opening 30 which is formed, viewed in the axial direction, between the first and second gas seal 27, 29, on the one hand, and the two hydraulic fluid seals 25, on the other hand, and is connected to the bore 21 in the gland 20, in this embodiment via the bore 31 (see FIG. 1C).

At the end 7a of the piston rod 7, the piston rod 7 comprises an entrainment mechanism 33. Preferably, the entrainment mechanism extends, viewed in the radial direction, in a non-sealing manner up to the cylinder sleeve 3. This prevents bending of the piston rod in the portion of the piston rod that protrudes into the gas space. The state of being non-sealing can also be expressed through one or more holes (not shown) in the entrainment mechanism that connect the gas space between the gland and the entrainment mechanism to the gas space between the cylinder bottom and the entrainment mechanism. In this embodiment, the entrainment mechanism is embodied as a guide and guides the piston rod 7 in the cylinder 3.

From the point of view of manufacture, it is advantageous to construct a hollow cylinder tube 3 without a cylinder bottom or cylinder head and afterwards to securely attach the cylinder bottom and cylinder head in the cylinder sleeve using seals 3d, 3e (see FIGS. 1B and 1D). The seals 3d are in this case gas-sealing and the seals 3e are in this case fluid-sealing.

The gland 20 is secured to the cylinder sleeve by means of a locking pin 40 (see FIG. 1C). This locking pin can be introduced via the filling opening, wherein gas can flow along the locking pin. In this embodiment, the locking pin 40 comprises a bore 41 through which gas can flow in the direction of the bore 31 in the gland 20.

For example, the gas has a pressure of between 100 and 200 bar.

The filling opening and/or a bore in the locking pin is shut off by a shut-off mechanism 42 (see FIG. 1C).

The construction of the drive cylinder using a method according to an embodiment of the invention will be described hereinafter with reference to FIGS. 2-5.

FIG. 2 shows a construction step for constructing the drive cylinder 1 from FIG. 1 in a method according to an embodiment of the invention. The figure shows that the gland 20 and the cylinder head 3b are mounted on the piston/piston rod assembly 5 in such a way that the second gas seal 29 is attached around the piston rod 7 separately from the associated seat 28 on the gland. The cylinder sleeve 3 with the cylinder bottom 3a is also mounted.

Afterwards, the mounted assembly of the piston/piston rod assembly, gland and cylinder head can be introduced into the cylinder sleeve as shown in FIG. 3. This causes the cylinder head and the gland to be positioned in a desired axial position. This is possible by, for example, designing the drive cylinder in such a way that when the piston rod rests against the cylinder bottom, the piston rests against the gland. As a result of friction between the gland and the cylinder sleeve, the gland will be brought against the piston during the introduction. When the piston rod has been introduced sufficiently far that the piston rod rests against the cylinder bottom, the gland is at the same time well positioned. The cylinder head can be positioned in the same manner in the cylinder sleeve by hand, by machine or by a stop on the piston rod.

The piston rod 7 is retracted, as may be seen. The entire retracting of the piston rod as described hereinbefore is not necessary, but can ensure that the gland is positioned. It also ensures a free passage for gas from the filling opening to the gas space 23. This free passage is partly made possible by the fact that the second gas seal is separate from the gland, as a result of which no seal is produced between the gland and the piston rod in this construction step.

Subsequently, the gland and the cylinder head are secured to the cylinder sleeve (as shown in FIG. 4), the gland being secured by a locking pin 40 which is attached via the filling opening. The locking pin prevents axial movement of the gland with respect to the cylinder sleeve. The locking pin can have a bore through which gas can flow.

The piston/piston rod assembly is blocked in the axial direction in order to prevent an axial movement of the piston/piston rod assembly while the gas space is filled with gas. Blocking can take place by mechanically securing that portion of the piston rod that protrudes outside the cylinder sleeve, but can for example also take place by filling the head-side chamber 13 with hydraulic fluid, so that the pressure on a head-side surface of the piston prevents axial displacement of the piston/piston rod assembly.

The gas space 23 can now be filled with gas which is supplied in pressurized form via the filling opening. Gas flows in this case through the locking pin, via the holes 31 towards the bore 21 and can flow through into the gas space as a result of the absence of the second gas seal between the gland and the piston rod. The situation obtained as a result is shown in FIG. 4.

The subsequent unblocking of the piston/piston rod assembly allows this assembly to be moved in the direction of the cylinder head. In this case, the entrainment mechanism 33 entrains the second gas seal in the direction of the gland. The piston/piston rod assembly is moved until the second gas seal is brought by the entrainment mechanism into its associated seat in the gland and thus provides a seal with the piston rod (see FIG. 5). The filling opening can be kept under gas pressure up to this moment, after which the gas pressure can be removed from the filling opening. Later, the shut-off mechanism can be attached if desired. In an alternative situation, which is deemed to be less advantageous, the shut-off member can also be attached first, after which the second gas seal is brought into its seat by the entrainment mechanism on the piston rod.

Once the second gas seal has been brought into its seat, the second gas seal is held in place by the pressure in the gas space and a durable seal is provided. The cylinder is now ready for use.

The invention claimed is:

1. Method for constructing a gas-filled double-acting hydraulic drive cylinder with integrated gas spring action, which drive cylinder comprises:
    a cylinder sleeve with a cylinder bottom and cylinder head arranged set axially apart from each other;
    a piston/piston rod assembly which can move axially back and forth, with a piston rod which protrudes outwards through an associated bore in the cylinder head and with a piston which is securely attached to the piston rod between, and set apart from, both ends of the piston rod and which is displaceable over an axial stroke between the cylinder bottom and the cylinder head;
    a hydraulic fluid seal on the piston for providing a seal with an inner surface of the cylinder sleeve, so that the piston delimits in the drive cylinder between the piston and the cylinder head a variable head-side chamber and further delimits between the piston and the cylinder bottom a variable bottom-side chamber;
    a connection for the head-side chamber to a hydraulic line;
    a connection for the bottom-side chamber to a hydraulic line;
    a gland with a bore, the gland being attached between the cylinder bottom and the piston, so that the gland forms a separation between the bottom-side chamber and a gas space located between the gland and the cylinder bottom, and the piston rod extending over the entire axial stroke of the piston rod through the bore,
characterized in that the gland comprises on a head-side edge two hydraulic fluid seals, one for providing a seal with the cylinder sleeve and one for providing a seal with the piston rod, and in that the gland comprises on a bottom-side edge a first and second gas seal, the first gas seal for providing a seal with the cylinder sleeve and the second gas seal for providing a seal with the piston rod, the cylinder sleeve having a filling opening which is formed, viewed in the axial direction, between the first and second gas seal, on the one hand, and the two hydraulic fluid seals, on the other hand, and is connected to the bore in the gland, and the piston rod comprising an entrainment mechanism on a bottom-side end, the method including the following steps:

a mounting the gland and the cylinder head on the piston/piston rod assembly in such a way that the second gas seal is attached separately from an associated seat on the gland, b mounting the cylinder sleeve with the cylinder bottom, c introducing the mounted assembly of the piston/piston rod assembly, gland and cylinder head into the cylinder sleeve in such a way that the gland and the cylinder head are positioned in a desired axial position and the piston rod is retracted, d mechanically securing the gland and the cylinder head to the cylinder sleeve, e mechanically blocking the piston/piston rod assembly in the axial direction, f filling the gas chamber with gas by supplying gas in pressurized form via the filling opening, g unblocking the piston/piston rod assembly, h moving the piston/piston rod assembly in the direction of the cylinder head until the second gas seal is brought by the entrainment mechanism on the piston rod into the associated seat in the gland.

2. Method according to claim 1, wherein the gland is secured to the cylinder sleeve by means of a locking pin.

3. Method according to claim 2, wherein the locking pin is introduced into the filling opening and wherein gas flows along the locking pin during filling.

4. Method according to claim 2, wherein the locking pin is introduced into the filling opening and wherein the locking pin comprises a bore through which gas flows during filling.

5. Method according to claim 1, wherein the filling opening and/or a bore in the locking pin is shut off by a shut-off mechanism after filling with the gas.

6. Method according to claim 1, wherein the filling opening remains pressurized until after step h).

7. Method according to claim 1, wherein the filling opening and/or a bore in the locking pin is shut off after step h) by a shut-off mechanism and the filling opening remains pressurized until that time.

8. Method according to claim 1, wherein the piston/piston rod assembly is blocked in step e) by means of the mechanical securing of the piston rod.

9. Method according to claim 1, wherein the piston/piston rod assembly is blocked in step e) by hydraulic pressure in the head-side chamber.

10. Method according to claim 1, wherein when the piston rod is retracted in step c), the piston rod rests against the cylinder bottom and the piston rests against the gland and the desired positioning of the gland is thus obtained.

11. Method according to claim 1, wherein the entrainment mechanism on the piston rod extends in a non-sealing manner in the radial direction up to the cylinder sleeve.

12. Drive cylinder obtained using the method according to claim 1.

* * * * *